United States Patent [19]
McMillan

[11] Patent Number: 5,921,443
[45] Date of Patent: Jul. 13, 1999

[54] PLANT FEEDER WITH FLOW CONTROL

[76] Inventor: Stephen E. McMillan, 5001 Seminary Rd., Alexandria, Va. 22311

[21] Appl. No.: 08/910,112

[22] Filed: Aug. 13, 1997

[51] Int. Cl.[6] ........................................................ B67D 5/64
[52] U.S. Cl. ......................... 222/174; 222/181.2; 47/48.5; 239/38; 239/280.5; 251/8
[58] Field of Search ................................ 47/48.5; 239/37, 239/38, 63, 280, 280.5, 281, 379; 251/8; 248/122.1, 224.1; 222/181.3, 181.2, 174

[56] References Cited

U.S. PATENT DOCUMENTS

| | | | |
|---|---|---|---|
| D. 340,843 | 11/1993 | Morton, Jr. | D8/1 |
| 1,534,913 | 4/1925 | Buck et al. | 222/181.3 X |
| 2,640,675 | 6/1953 | Farris | 251/5 |
| 2,954,028 | 9/1960 | Smith | 251/8 X |
| 3,125,255 | 3/1964 | Kaiser | 222/181.3 X |
| 3,318,457 | 5/1967 | Krasnoff | 248/125.1 X |
| 3,357,129 | 12/1967 | Torrence | 47/48.5 X |
| 3,908,952 | 9/1975 | Von Alven | 222/181.3 X |
| 4,042,150 | 8/1977 | Roos | 222/70 |
| 4,121,584 | 10/1978 | Turner | 128/214 E |
| 4,214,701 | 7/1980 | Beckmann | 239/63 |
| 4,312,493 | 1/1982 | Stauffer | 251/8 |
| 4,575,041 | 3/1986 | Hu | 251/8 |
| 4,578,897 | 4/1986 | Pazar et al. | 47/48.5 |
| 4,744,536 | 5/1988 | Bancalari | 248/125.8 |
| 4,905,944 | 3/1990 | Jost et al. | 248/125.8 |
| 5,097,626 | 3/1992 | Mordoch | 47/79 |
| 5,383,601 | 1/1995 | Astle | 239/276 |
| 5,421,122 | 6/1995 | Hyndman | 47/48.5 |
| 5,725,156 | 3/1998 | Park | 47/48.5 X |
| 5,772,162 | 6/1998 | Lin | 248/125.1 X |

*Primary Examiner*—Kenneth Bomberg
*Attorney, Agent, or Firm*—Frederick F. Tsung

[57] ABSTRACT

A plant feeder includes a reservoir container, a stand supporting the container, a fluid feed line, and a flow control valve. The reservoir container provides a source of fluid nourishment for feeding plants, and includes an outlet for dispensing the fluid nourishment, and an inlet which provides aeration. The stand supports the reservoir container through a releasable securing mechanism, such as a lattice harness. The stand includes mutually adjustable vertical supports, a stand foot, and a reservoir support. The feed line is attached on one end to the outlet of the reservoir container. The flow control valve is disposed in the feed line to provide controlled meter dosing of fluid nourishment from the container, and may be adjustably attached through a casing and lateral supports to the stand. A control valve with a flexible valve line and an impinging annular ring adjusted through a radial pin structure is described.

17 Claims, 4 Drawing Sheets

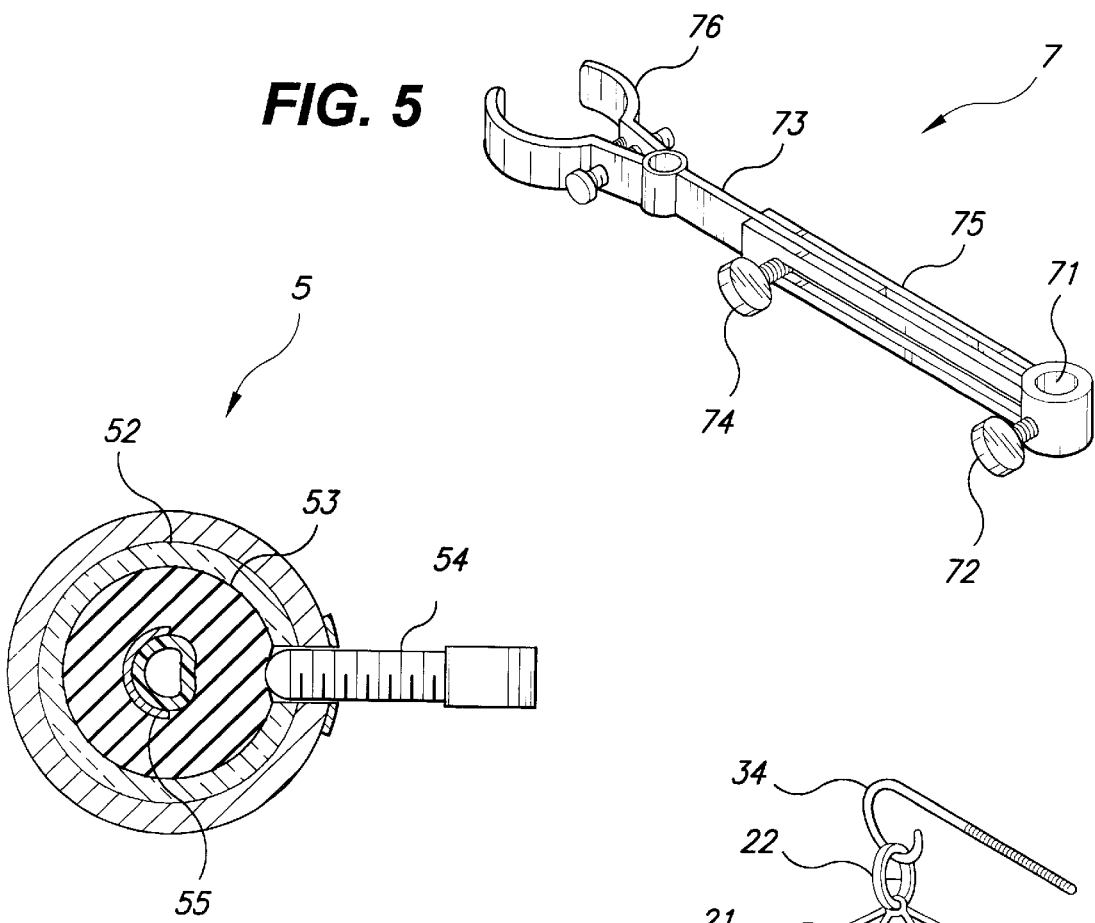
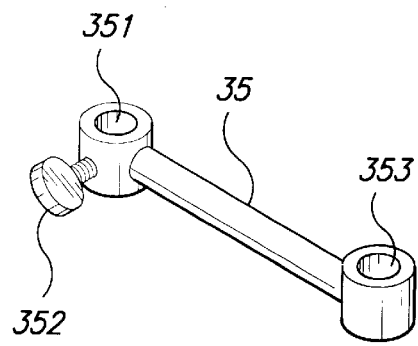
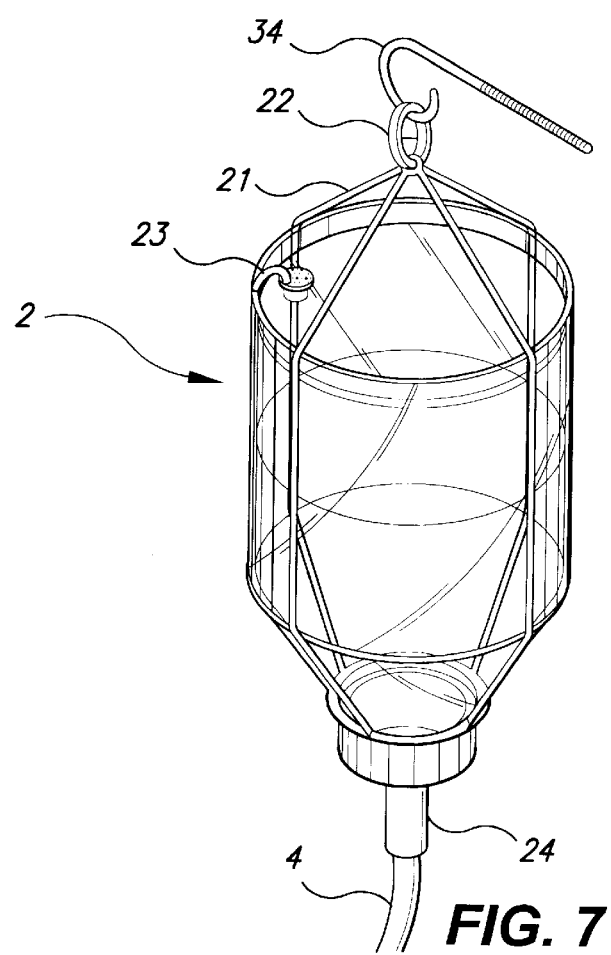
FIG. 5
FIG. 4
FIG. 6
FIG. 7

PLANT FEEDER WITH FLOW CONTROL

BACKGROUND OF THE INVENTION

1. Field of the Invention

The present invention relates to domestic plant husbandry. More specifically, the present invention relates to devices for providing liquid nourishment to houseplants.

2. Description of the Prior Art

In growing plants, providing sufficient fluids on a continuing basis is required. This is typically accomplished by a care-taker directly applying the fluids to the plants manually, at regular time intervals, requiring a fairly consistent presence of the care-taker. Often, such a presence is not possible or inconvenient, such as instances when work or vacation causes prolonged separation of the care-taker and plants. Various methods and apparatuses have been proposed for such instances. U.S. Pat. No. 4,042,150, issued Aug. 16, 1977 to Roos describes a water gravity plant feeder having a housing with a water bottle, a feed tray, a water trough, and a water distributor. Though effective, this rather large apparatus requires that any plants to be watered are moved and/or placed adjacent the housing. U.S. Pat. No. 4,578,897, issued Apr. 1, 1986 to Pazar et al. describes a plant watering unit in which fluid is provided only when a fluid level drops to expose an outlet orifice to air. U.S. Pat. No. 5,097,626, issued Mar. 24, 1992 to Mordoch describes an automatic watering system for plants that includes a valve controlled by a dryness sensor. U.S. Pat. No. 5,383,601, issued Jan. 24, 1995 to Astle describes a drip irrigating apparatus that has both inlet and outlet control mechanisms for controlling fluid delivered to a fluid reservoir and from the reservoir directly to the ground. U.S. Design Pat. No. D340,843, issued Nov. 2, 1993 to Morton, Jr. Shows a funnel shaped plant watering device.

Other apparatuses for distributing fluids, other than for watering plants are of course known, such as U.S. Pat. No. 4,121,584, issued Oct. 24, 1978 to Turner, which describes an intravenous fluid control device that performs sequential measuring and dispensing of fluids during specified time intervals. Further, flow control in a conduit has been described, as by U.S. Pat. No. 2,640,675 issued Jun. 2, 1953 to Farris, which shows a manually operated pinch valve that includes a flexible conduit, and a clamping member and a frame member, where the conduit may be constricted by adjusting the distance between the clamping member and the frame member.

SUMMARY OF THE INVENTION

The present invention relates to a plant feeder having a reservoir container, a stand supporting the container, a fluid feed line, and a flow control valve. The reservoir container provides a source of fluid nourishment for feeding plants, and includes an outlet for dispensing the fluid nourishment, and an inlet which provides aeration.

The stand supports the reservoir container proximate a plant, but suspended to avoid damage which may occur from direct contact therewith. The stand includes a plurality of mutually adjustable vertical support members, a stand foot, and a reservoir support member. Preferably, the stand includes a lower stand section attached to the stand foot and an upper stand section attached to the reservoir support member. A first coupler may be fixedly attached to the lower stand section at an end distal the stand foot. This first coupler preferably includes an aperture for slidably receiving the upper stand section, and a securing mechanism to lock the coupler in position. A second coupler may then be fixedly attached to the upper stand section at an end distal the reservoir support member, and provided with an aperture mechanism for slidably receiving and securing the lower stand section.

The feed line is attached on one end to the outlet of the reservoir container, while the other end is open. The flow control valve is disposed in the feed line to provide controlled meter dosing of fluid nourishment from the container to the open end of the feed line.

The flow control valve preferably includes an inflow end and an outflow end, with the inflow end in fluid communication through a first section of the feed line with the outlet of the reservoir container, and the outflow end connected to a second section of the feed line. A flexible valve line is preferably used to connect the inflow end with the outflow end. By varying a cross-section flow area of the valve line, the flow of fluid nourishment through the valve may be adjusted as desired.

To achieve variable flow control, the valve may be provided in a casing, preferably with a rigid shell and an annular ring of resilient material disposed within the rigid shell. The valve line is disposed through an annulus of the annular ring and a mechanism is provided for constricting the annular ring. This may be accomplished with a pin adjustably disposed through the rigid shell to contact and impinge the annular ring, which in turn impinges the valve line. Preferably, the pin is threaded through the rigid casing to provide adjustability. A rigid impingement plate may be provided to stiffen the annular ring in the area diametrically opposite the pin.

The casing may be adjustably attached to the stand through one or more casing support members. Each casing support member may be adjustably attached to the stand at a plurality of heights to accommodate different plant pots. The casing support member(s) may also be adjustably lengthened or shortened such that the distance between the casing and the stand is adjustable.

The container and stand are releasably attached to each other through a container securing mechanism. The container securing mechanism may include a harness with a support lattice for securely holding the container and a connector for connecting the lattice to the reservoir support member of the stand. The support lattice may be formed of a plurality of longitudinal strands and at least one banding strand substantially orthogonal to the longitudinal strands. The strands may be formed of flexible strand material, such that the reservoir container may be removed or inserted in the harness by spreading the lattice strands. Preferably, the longitudinal strands are connected to each other at a point and/or to a suspending ring.

Accordingly, it is a principal object of the invention to provide a plant feeder for the prolonged, unattended feeding of plants with liquid nourishment.

It is another object of the invention to provide a plant feeder which is fully adjustable in structure to accommodate various plant and plant receptacle sizes.

It is a further object of the invention to provide an adjustable flow control in a plant feeder.

Still another object of the invention is to provide a plant feeder of uncomplicated construction, which is yet fully effective in accomplishing its objects.

These and other objects of the present invention will become readily apparent upon further review of the following specification and drawings.

BRIEF DESCRIPTION OF THE DRAWINGS

FIG. 4 is a top cross-sectional view of the same flow control mechanism and casing.

FIG. 5 is a perspective view of a flow control casing support member according to an embodiment of the present invention.

FIG. 6 is a perspective view of a stand coupler according to an embodiment of the present invention.

FIG. 7 is a partial perspective view showing a reservoir and reservoir supports according to an embodiment of the present invention.

Similar reference characters denote corresponding features consistently throughout the attached drawings.

Detailed Description of the Preferred Embodiment

Figure 1:
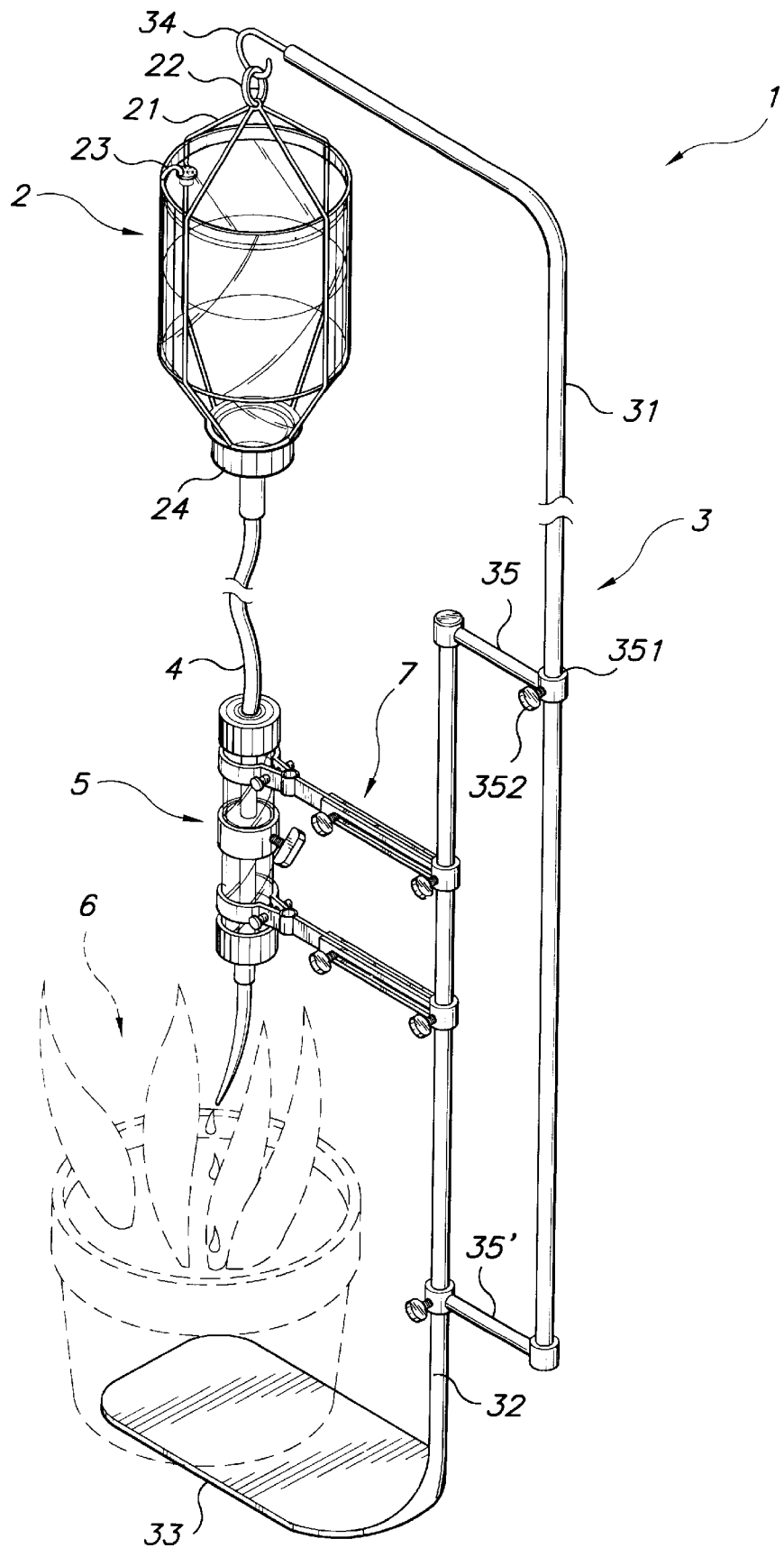
FIG. 1 is a perspective view of one preferred embodiment of the present plant feeder.

The present invention, as best shown in FIG. 1, is a plant feeder 1, that includes a reservoir container 2, a stand assembly 3 supporting the container, a fluid feed line 4, and a flow control valve assembly 5, disposed in the fluid feed line. The present invention is easily positioned relative a plant, such as potted plant 6, and supplies fluid from the reservoir to the plant.

Stand 3 includes a plurality of mutually adjustable vertical support members or stand sections, a stand foot 33, and a reservoir support member 34. Plant 6, as shown is placed on the stand foot, or the stand foot is inserted under the plant. In this manner the plant feeder as a whole is positionally secured relative the target plant. Preferably, the stand includes a lower stand section 32 attached to the stand foot 33 and an upper stand section 33 attached to the reservoir support member 34. Lower stand section 32 and stand foot 33 are most preferably unitarily made, as shown, to provide rigidity and stability.

To attach the lower stand section to the upper section in an vertically adjustable manner, a pair of couplers are used. A first coupler 35 may be fixedly attached to the lower stand section at an end distal the stand foot. This first coupler preferably includes an aperture 351 for slidably receiving the upper stand section, and a securing mechanism 352 to lock the coupler in position. A second coupler 35' may then be fixedly attached to the upper stand section at an end distal the reservoir support member, and provided with an aperture and securing mechanism for slidably receiving and securing the lower stand section. The structure of the first coupler and second coupler may be identical, and is best be seen in FIG. 6. A fitting 353 may also be provided for fixedly attaching the coupler to one or the other of the stand sections, as previously described. Preferably, fitting 353 has a cavity sized smaller than opening 352 to frictionally engage and fix the stand section.

Turning back to FIG. 1, the reservoir support member of stand 3, supports the container 2, preferably through a container securing mechanism. The container securing mechanism may include a harness 21 with a support lattice for securely holding the container and a connector 22 for connecting the lattice to the reservoir support member 34 of the stand. The support lattice may be formed of a plurality of longitudinal strands and at least one banding strand substantially orthogonal to the longitudinal strands. The strands may be formed of flexible strand material, such that the reservoir container may be removed or inserted in the harness by spreading the lattice strands. Preferably, the longitudinal strands are connected to each other at a point and/or to a suspending ring, which serves as the connector, as shown best in FIG. 7. Also, as shown, container 2 includes an aeration inlet 23, which may be in the form of a removable plug having a plurality of holes therein. Outlet 24 is provided distal inlet 23, and may include a threaded capping assembly with an aperture provided therethrough for feed line 4.

Feed line 4 is attached on one end to the outlet of the reservoir container, while the other end is open to the plant 6. The flow control valve assembly 5 is disposed in the feed line to provide controlled metered dosing of fluid nourishment from the container to the open end of the feed line.

Figure 2:
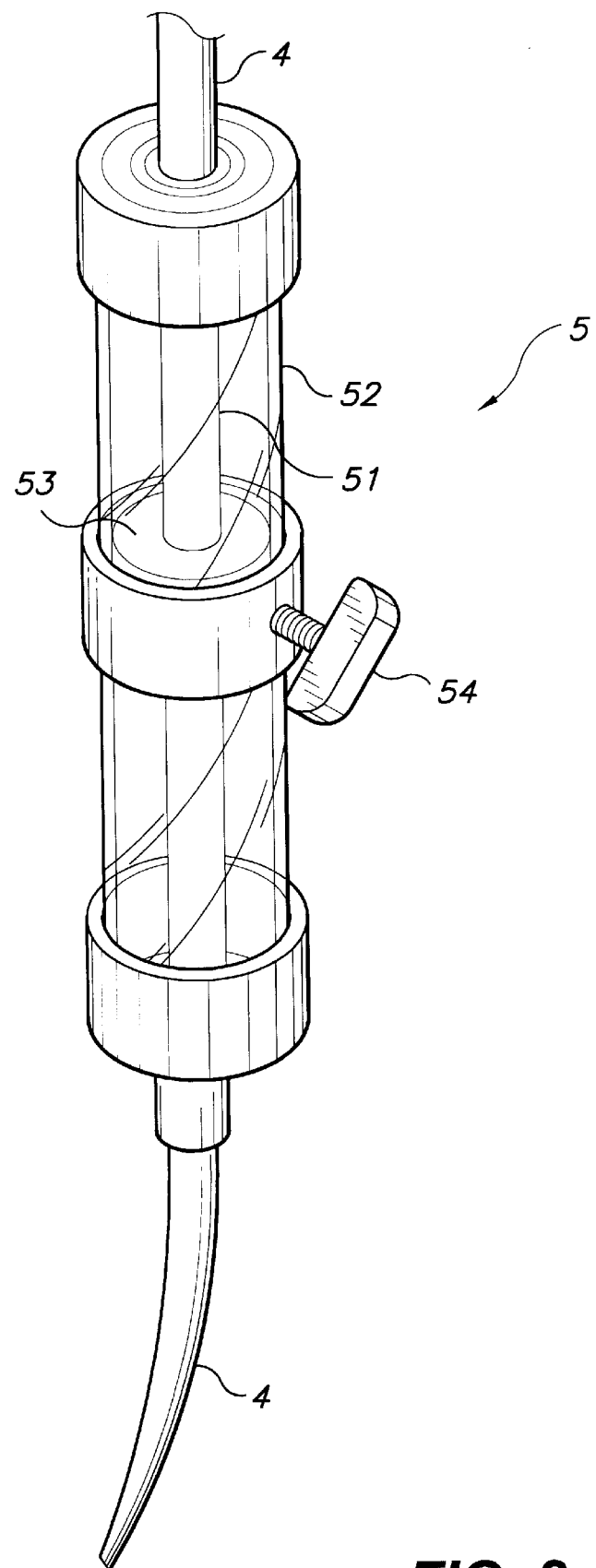
FIG. 2 is a partial perspective view showing a flow control mechanism and casing according to the present invention.

As best seen in FIG. 2, The flow control valve assembly preferably includes an inflow end and an outflow end, with the inflow end connected to a first section of the feed line 4, and the outflow end connected to a second section of the feed line 4. A flexible valve line 51 is preferably used to connect the inflow end with the outflow end of the feed line. By varying a cross-section flow area of the valve line, the flow of fluid nourishment through the valve may be adjusted as desired.

Figure 3:
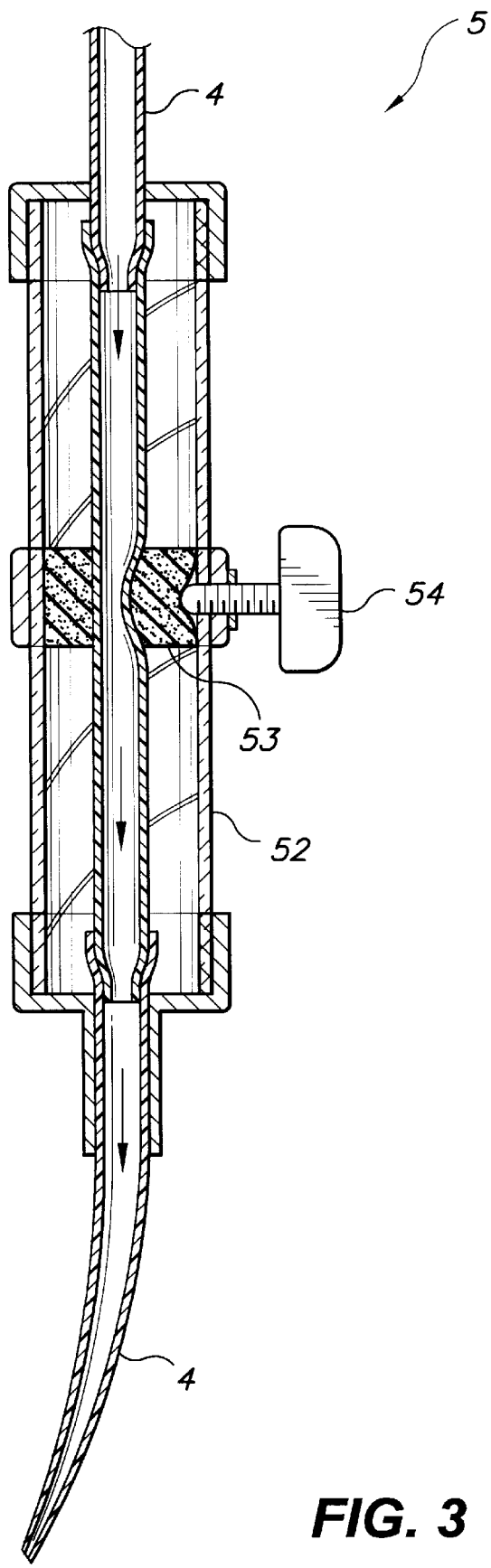
FIG. 3 is a side cut-away view showing the same flow control mechanism and casing.

To achieve variable flow control, the valve may be provided in a casing, preferably with a rigid shell 52 and an annular ring 53 of resilient material disposed within the rigid shell. The valve line is disposed through an annulus of the annular ring and a mechanism is provided for constricting the annular ring, such as with a pin 54 adjustably disposed through the rigid shell to contact and impinge the annular ring, which in turn impinges the valve line, as shown in cutaway by FIG. 3. Preferably, the pin is threaded through the rigid casing to provide adjustability. A rigid impingement plate 55 may be provided to stiffen the annular ring in the area diametrically opposite the pin, as shown in top cross-section by FIG. 4.

The casing of the valve control assembly may be adjustably attached to the stand through one or more casing support members 7. Each casing support member may be adjustably attached to the stand at a plurality of heights to accommodate different plant pots. To this end, a casing support aperture 71 for receiving either stand section 32 or 31 may be provided, as best shown in FIG. 5, with corresponding securement through a casing securing screw 72. The casing support member(s) may also be adjustably lengthened or shortened such that the distance between the casing and the stand is adjustable. A tongue 73 and groove 75 arrangement with tongue securing screw 74 is shown. Further, the casing support member may include an adjustable clamp 76 for securing the casing of the flow control valve assembly thereto.

It is to be understood that the present invention is not limited to the any single embodiment described above, but encompasses any and all embodiments within the scope of the following claims.

I claim:

1. A plant feeder for providing sustained fluid nourishment to a plant over an extended time period, said feeder comprising:

a reservoir container having an outlet for dispensing fluid nourishment contained therein and an inlet for aeration of said container;

a vertically adjustable stand for releasably supporting said reservoir container, said stand including a plurality of mutually adjustable vertical support members, a stand foot, and a reservoir support member;

container securing means for securing said container to said reservoir support member of said stand;

a feed line in fluid communication with said outlet of said reservoir container; and a flow control valve disposed in said feed line;

wherein said vertically adjustable stand includes a lower stand section attached to said stand foot; an upper stand section attached to said reservoir support member; a first coupler fixedly attached to said lower stand section at an end distal said stand foot, said first coupler having an aperture for slidably receiving said upper stand section, and upper securing means for adjustably securing said upper section; and a second coupler fixedly attached to said upper stand section at an end distal said reservoir support member, said second coupler having an aperture for slidably receiving said lower stand section and lower securing means for adjustably securing said lower section.

2. The plant feeder of claim 1 wherein said container securing means comprises a harness with a support lattice for securely holding said container and a connector for connecting said lattice to said reservoir support member of said stand.

3. The plant feeder of claim 2 wherein said support lattice is formed of a plurality of longitudinal strands and at least one banding strand; said longitudinal strands being substantially orthogonal to each of said at least one banding strand.

4. The plant feeder of claim 3 wherein said support lattice is formed of flexible strand material.

5. The plant feeder of claim 3 wherein said longitudinal strands are connected at a point to a suspending ring.

6. The plant feeder of claim 1 wherein said flow control valve includes an inflow end and an outflow end; said inflow end in fluid communication through a first section of said feed line with said outlet of said reservoir container; said outflow end connected to a second section of said feed line; a flexible valve line connecting said inflow end with said outflow end; means for impinging on said valve line, such that a cross-sectional flow area of said valve line is variable; thereby controlling flow of fluid nourishment to said second section of said feed line.

7. The plant feeder of claim 3 wherein said flow control valve is provided in a casing.

8. The plant feeder of claim 7 wherein said casing includes a rigid shell and an annular ring of resilient material disposed within the rigid shell, said valve line disposed through an annulus of said annular ring; and a pin adjustably disposed through said rigid shell to contact and impinge said annular ring, which in turn impinges said valve line.

9. The plant feeder of claim 8 wherein said pin and said casing are complementarily threaded such that impingement of said pin on said annular ring may be adjusted.

10. The plant feeder of claim 7 wherein said casing is adjustably attached to said stand through at least one casing support member.

11. The plant feeder of claim 10 wherein said casing support member is adjustably attached to said stand at a plurality of heights relative said foot of said stand.

12. A plant feeder for providing sustained fluid nourishment to a plant over an extended time period, said feeder comprising:

a reservoir container having an outlet for dispensing fluid nourishment contained therein and an inlet for aeration of said container;

a vertically adjustable stand for releasably supporting said reservoir container, said stand including a plurality of mutually adjustable vertical support members, a stand foot, and a reservoir support member;

container securing means for securing said container to said reservoir support member of said stand;

a feed line in fluid communication with said outlet of said reservoir container; and a flow control valve disposed in said feed line;

wherein said flow control valve includes an annular ring of resilient material, said feed line disposed through an annulus of said annular ring; and a pin adjustably disposed to contact and impinge said annular ring, which in turn impinges said feed line; and a rigid impingement plate is provided in said annulus of said annular ring, diametrically opposite said pin.

13. The plant feeder of claim 12 wherein said flow control valve includes an inflow end and an outflow end; said inflow end in fluid communication through a first section of said feed line with said outlet of said reservoir container; said outflow end connected to a second section of said feed line; said feed line includes a flexible valve line connecting said inflow end with said outflow end; wherein said annular ring, pin and impingement plate are disposed along said valve line.

14. The plant feeder of claim 12 wherein said valve is disposed in a casing, and said pin and said casing are complementarily threaded such that impingement of said pin on said annular ring may be adjusted.

15. A plant feeder for providing sustained fluid nourishment to a plant over an extended time period, said feeder comprising:

a reservoir container having an outlet for dispensing fluid nourishment contained therein and an inlet for aeration of said container;

a vertically adjustable stand for releasably supporting said reservoir container, said stand including a plurality of mutually adjustable vertical support members, a stand foot, and a reservoir support member;

container securing means for securing said container to said reservoir support member of said stand;

a feed line in fluid communication with said outlet of said reservoir container; and a flow control valve disposed in said feed line;

wherein said flow control valve is provided in a casing, said casing is adjustably attached to said stand through at least one casing support member, and said casing support member may be adjustably lengthened or shortened such that the distance between said casing and said stand is adjustable.

16. The plant feeder of claim 15 wherein said casing support member is adjustably attached to said stand at a plurality of heights relative said foot of said stand.

17. The plant feeder of claim 15 wherein said flow control valve includes an inflow end and an outflow end; said inflow end in fluid communication through a first section of said feed line with said outlet of said reservoir container; said outflow end connected to a second section of said feed line; a flexible valve line connecting said inflow end with said outflow end; means for impinging on said valve line, such that a cross-sectional flow area of said valve line is variable; thereby controlling flow of fluid nourishment to said second section of said feed line.

* * * * *